Aug. 11, 1931.    C. E. BELT    1,818,838
VEHICLE CHASSIS
Filed Dec. 14, 1925    2 Sheets-Sheet 1
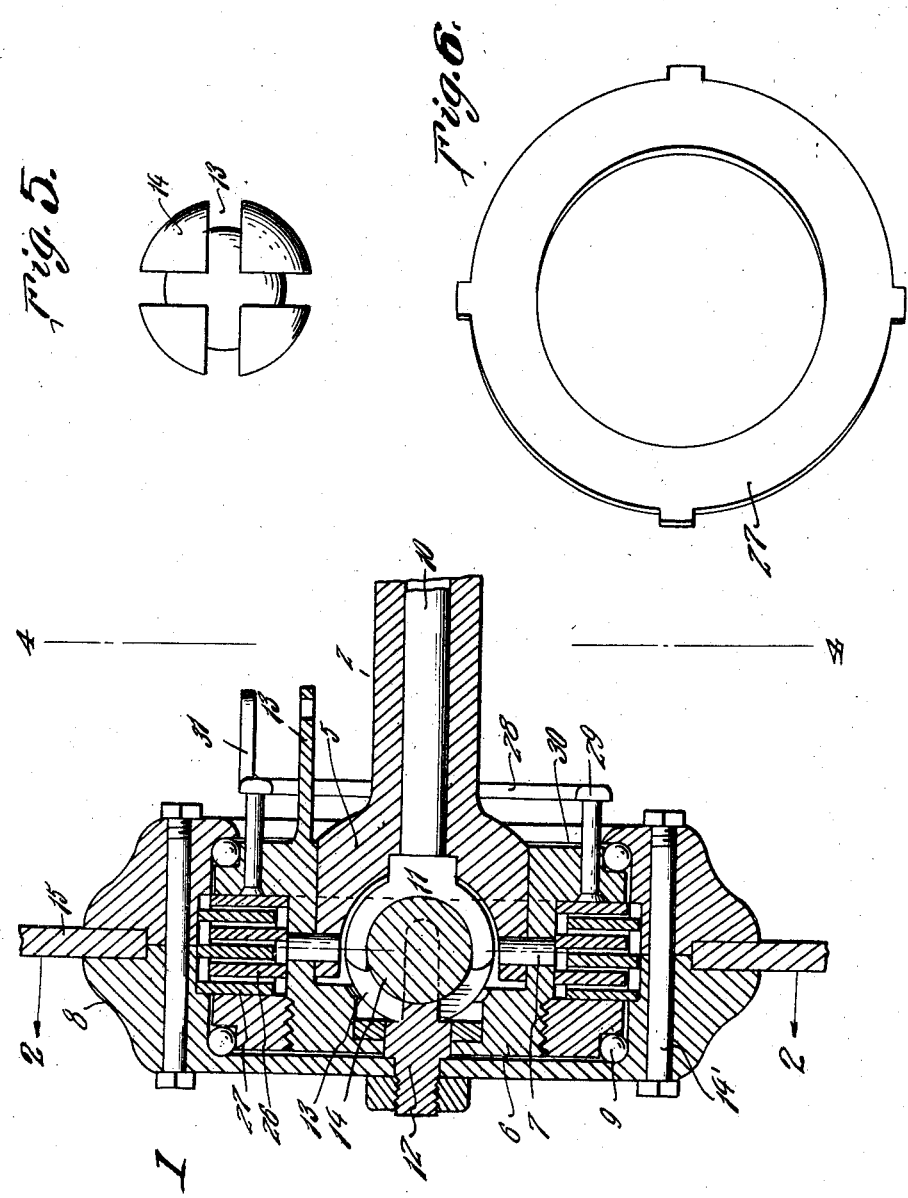

Aug. 11, 1931.  C. E. BELT  1,818,838
VEHICLE CHASSIS
Filed Dec. 14, 1925    2 Sheets-Sheet 2
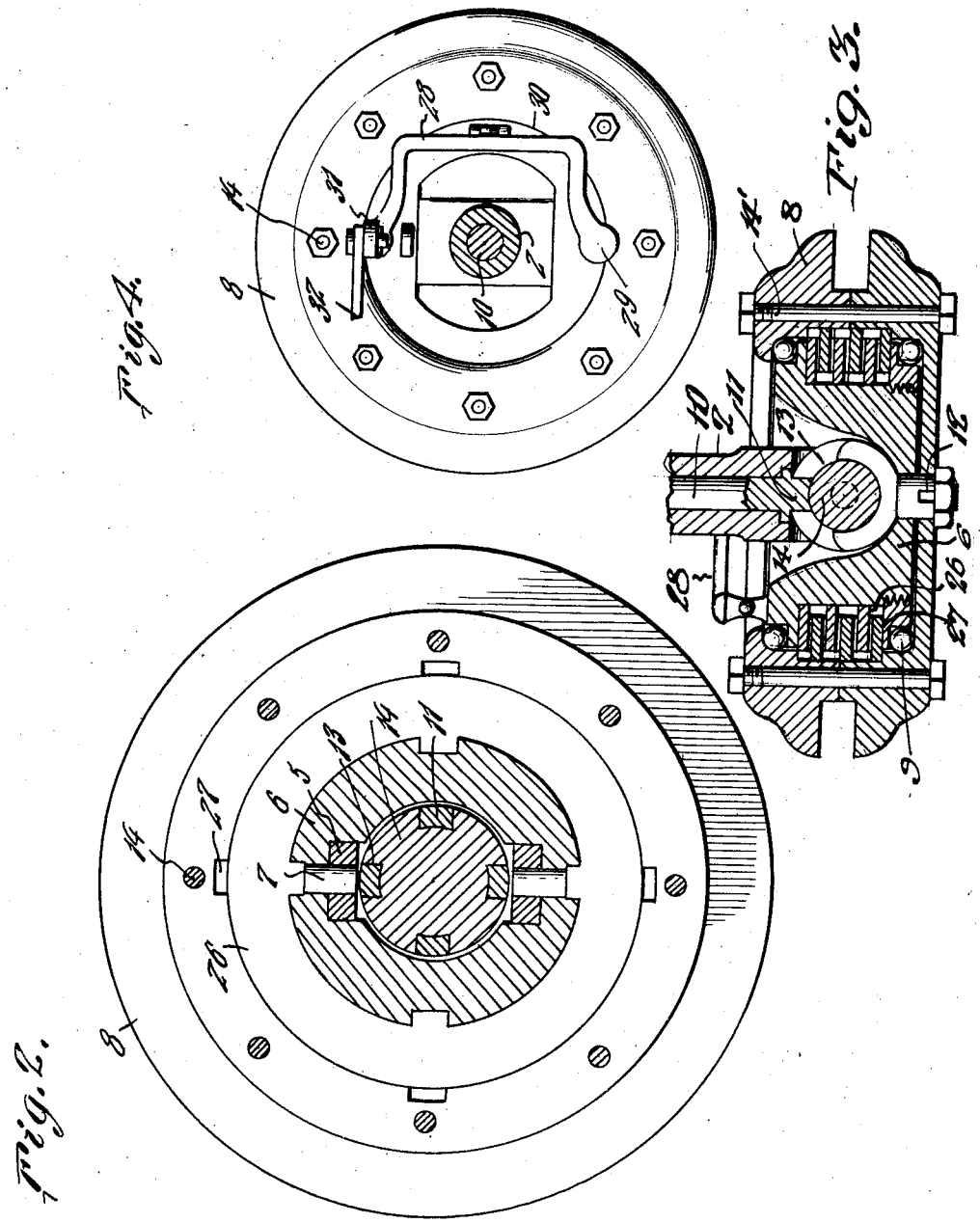

Patented Aug. 11, 1931

1,818,838

UNITED STATES PATENT OFFICE

CHARLEY E. BELT, OF JENKINS, KENTUCKY

VEHICLE CHASSIS

Application filed December 14, 1925. Serial No. 75,391.

The present invention relates generally to a chassis for a motor operated vehicle and more particularly to a novel construction of means for mounting the wheels, whereby the latter can be rocked about a vertical axis in order to permit the vehicle to be steered with all wheels, and also provide a driving shaft for each wheel.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a vertical sectional view through one of the wheels.

Figure 2 is a section on line 2—2 of Figure 1.

Figure 3 is a sectional view taken at right angles to Figure 1.

Figure 4 is a section on line 4—4 of Figure 1.

Figure 5 is a view of the grooved ball for the universal joint of one of the wheels.

Figure 6 is a view of one of the brake disks.

In the drawings, I have illustrated a single wheel mounting, and wherein 2 indicates a hollow axle. The outer end of each axle is made in the form of a fork 5 to which a hub member 6 is pivotally connected by the pivot pins 7, so that the member 6 can rock about a vertical axis on the end of the housing. A wheel hub 8 is rotatably mounted on the hub member 6, antifriction members 9 being arranged between the two parts. The axle carries a driven shaft 10, the outer end of which is forked, as at 11, and each hub 8 carries a forked shaft 12 which is in alignment with the shaft 10. The forked ends of these shafts engage the grooves 13 formed in a ball 14 which occupies a space formed by the forked end 5 of the housing and the recess in the hub member 6. By this arrangement, the hub 8 of each wheel can be rotated by each shaft 10 and each wheel can be rocked on its pivots 7 without interfering with the driven motion. Each hub part 6 is provided with an inwardly extending arm 13 for receiving the steering rods, (not shown). The hub 8 of each wheel is formed of two parts which are bolted together by the bolts 14 and these parts clamp between them the spokes or disks of the wheel 15.

As will be seen, the hub member 6 has a recess therein to receive the forked ends of the axle and of the drive shaft and also the spherical member and the forked end of the shaft 12, with the front part of the hub member having an opening therein which communicates with the recess and which forms a bearing for the shaft 12. The recess is closed so that it may be packed with grease to lubricate the parts within the same.

I provide a brake for each wheel, such brake comprising a plurality of disks 26 carried by each member 6 and a plurality of disks 27 carried by each wheel hub 8, these disks overlapping and normally being spaced apart so that they will not interfere with the rotary movement of hub 8 on the hub member 6. When the brake is to be applied, a yoke-shaped member 28 privotally supported on each part 6, is rocked so that its enlarged ends 29 will engage pins 30 movably mounted in the member 6, so as to force said pins inwardly against one of the disks 26 and thus move the disks together so that they will frictionally engage each other and thus check the movement of the wheel 8.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

In a motor vehicle, a hollow axle having a forked end, a hub member having a recess therein to receive the forked end of the axle, an annular flange carried by one end of the hub member, the opposite end of said member being exteriorly threaded, a ring-like member threaded on the outer end of said hub and arranged in spaced confronting relation with said flange, said ring and flange being grooved, ball-bearings arranged in said groove, a wheel hub rotatably mounted on said bearings and including an integral outer plate closing the outer end of the hub, the inner end of the hub having an opening and formed with an inwardly directed flange to engage and maintain the adjacent bearings in place, said plate having a restricted central opening, a shaft journaled in said opening in the hub member and fastened to the front face of the wheel hub, a drive shaft extending through the hollow axle, and a universal joint connecting the respective axles.

In testimony whereof I affix my signature.

CHARLEY E. BELT.